UNITED STATES PATENT OFFICE.

HENRY S. SPACKMAN, OF ARDMORE, PENNSYLVANIA, AND ELLIS W. LAZELL, OF PORTLAND, OREGON; SAID LAZELL ASSIGNOR TO SAID SPACKMAN.

PLASTER COMPOSITION AND PROCESS OF MAKING THE SAME.

1,142,989. Specification of Letters Patent. Patented June 15, 1915.

No Drawing. Application filed May 22, 1912. Serial No. 698,906.

*To all whom it may concern:*

Be it known that we, HENRY S. SPACKMAN, a citizen of Ardmore, Montgomery county, Pennsylvania, and ELLIS W. LAZELL, formerly a resident of the city and county of Philadelphia, Pennsylvania, and now a resident of Portland, Multnomah county, Oregon, have made certain new and useful Inventions Relating to Plaster Compositions and Processes of Making the Same, of which the following is a specification.

This invention relates especially to plaster compositions, that is to say, calcareous materials or compositions useful as plasters, mortars, and so forth, and to processes of making the compositions by triturating or crushing together hydrated lime and calcium aluminate, calcium sulfate, acid sodium sulfate, sodium disulfate, sodium bisulfate or other suitable strength accelerating material or mixtures thereof, the components being thoroughly incorporated so as to effect intimate physical union and being simultaneously densified or compacted so as to increase the density and plasticity and render the wall plaster or other compositions more reliable and easily workable and make them harden more rapidly under service conditions.

Calcium aluminum compounds of substantially the composition of calcium aluminates which contain from one to three molecules of lime to one of alumina may be prepared by calcining finely ground lime and bauxite or other aluminum compound, such as kaolin or high aluminum clays, the burned material when lime and bauxite are employed being sintered and given a very quick initial set when ground and moistened with water. Calcium aluminate material, such as is formed preferably by thoroughly calcining or sintering a relatively small proportion of available lime as compared with the available alumina present, attains its initial set after a relatively long period and its final set in a relatively short time thereafter. Such low-lime calcium aluminate cement materials, besides being themselves more or less strongly hydraulic and cementitious, exert a valuable energizing action on cementitious material comprising lime or other earthy alkali material (such as magnesia, baryta, strontia, or other material capable of combining with coöperating silicious material and calcium aluminate strength accelerating material. Such low-lime calcium aluminates may preferably be prepared by uniting suitably proportioned mixtures of finely ground lime, magnesia or other earthy alkali with bauxite or other material rich in alumina or alumina-like material, the components being incorporated in such proportions that the lime for example is present to the extent of not more than about thirty-three per cent. of the alumina available for combination therewith, after making due allowance for the lime required by any other components which may be present. These calcium aluminate accelerating or cement materials may be conveniently prepared by heating to the extent required to cause sufficient union of the components to develop the desired strength accelerating, slow-setting or other properties, as by calcination to a clinkering or sintering temperature and if desired the material without the necessity of grinding may be still further heated to complete fusion as in a blast furnace after which it may be advantageously granulated in water or otherwise before being ground, the higher the temperature of union the slower as a general thing is the setting action. It is of course understood that iron oxid or similar material may be used in some cases to replace to some extent at least the alumina in this accelerating material, and that other earthy alkali material, such as magnesia and so forth, may be substituted for part at least of the lime combined, that is, more or less closely united therewith, such calcium aluminates and equivalent or substitute accelerating or energizing material being designated earthy alkali, strength accelerating compounds of alumina-like material.

Suitable proportions of calcium aluminate or similar strength accelerating material and also if desired of controlling material to assist in effecting the desired quickness of set and increase of strength may be prepared and incorporated at any time before utilization with the independently cementitious material comprising oxids, hydrates or otherwise available lime or similarly acting earthy alkali material combining or capable of combining with the aluminous accelerating material and coöperating silicious material which may also be present if desired; suitable controlling material such as sulfate of lime, sulfuric acid and in the case of plastic compositions, glue, starch, etc., may also be uniformly incorporated. The aluminous accelerating material preferably in finely divided condition may be prepared and incorporated before or after the gaging of the cementitious material or may be dissolved or incorporated in the gaging water; preferably, however, the strength accelerating and controlling material may be uniformly incorporated with the independently cementitious material so as to form a finely divided material convenient for transportation and utilization since it becomes immediately effective when water is added thereto. An illustrative slow-setting, hydraulic, highly cementitious, calcium aluminate produced by thorough calcination had the following approximate analysis:

Silica ($SiO_2$) _____ 2.12%
Alumina ($Al_2O_3$) _____ 65.32
Iron ($Fe_2O_3$) _____ 12.16
Lime (CaO) _____ 20.94
Magnesia (MgO) _____ .44
Volatile matter _____ None.

A diversely prepared calcium aluminate higher in lime, having an initial set of five minutes and a final set of seven minutes contained:

Silica ($SiO_2$) _____ 2.76%
Alumina ($Al_2O_3$) _____ 37.27
Iron ($Fe_2O_3$) _____ 6.47
Lime (CaO) _____ 47.12
Magnesia (MgO) _____ .46
Volatile matter _____ 2.20

Several illustrative examples of slow-setting, hydraulic, aluminous, strength accelerating materials containing considerable silica and which were completely fused during their manufacture so as to have comparatively slight strengths at early periods when used alone or in the absence of available lime were produced in a blast furnace using iron ores containing approximately fourteen per cent. of alumina, these aluminous slags had the following approximate analyses:

|  | No. 1. | No. 2. |
|---|---|---|
| Silica ($SiO_2$) | 29.12% | 31.96% |
| Alumina ($Al_2O_3$) | 34.28 | 28.94 |
| Iron (Fe) | 2.40 | 2.39 |
| Lime (CaO) | 29.82 | 28.46 |
| Magnesia (MgO) | 2.32 | 3.78 |

Such fused aluminous and other calcium aluminate strength accelerating material may be advantageously incorporated in comparatively small proportions with suitable plaster or cementitious material such as lime or similar alkali material, these compositions comprising from about one to ten per cent. of incorporated alumina and having greatly increased setting spreading and sand-carrying properties. Such suitable illustrative plaster compositions may be prepared by incorporating five to twenty per cent. of such fused calcium aluminate strength accelerating cement material with ordinary hydrated lime, in connection, if desired, with suitable stretchers such as ground sand or other inert material or other ingredients. The following table shows the tensile strengths when tested with four parts of commercial sand, of hydrated lime with which ten and fifteen per cent. of this fused aluminous material containing a considerable amount of silica had been incorporated:

|  | Hydrated lime with 10% aluminate. | Hydrated lime with 15% aluminate. |
|---|---|---|
| 24 hours | 35 lbs. | 38 lbs. |
| 7 days | 66 lbs. | 68 lbs. |
| 28 days | 75 lbs. | 78 lbs. |

Various proportions of the higher lime aluminous accelerator which may be produced by the calcination of about one to three molecular weights of lime to one of alumina may be added to slaked lime so as to secure the desired quickness of set and increase of strength of the material. A good composition for use as commercial wall plaster may be prepared by incorporating such an amount of aluminous accelerating material with lime or other plaster material as to increase its alumina content from one to ten per cent., the ingredients being preferably thoroughly mixed by grinding them together or otherwise. The hardness and strength of plastic, that is to say, cementitious materials of this character, may be increased by the incorporation of a suitable small proportion of silicious or pozzuolanic material to the extent of about one to ten per cent.; it being also desirable to add from one to five per cent. of plaster of Paris to control the setting. A desirable composition for general use as wall plaster may be prepared by incorporating eighty-six parts of dry hydrated lime, ten parts of calcium aluminate accelerating material containing approximately 40% of alumina, two parts of plaster of Paris and two parts of infusorial earth. This material when the components were thoroughly incorporated and finely ground together so that ninety-five per cent. passed through a one hundred mesh sieve had an initial setting time of about four hours and was completely set in about fifteen hours according to the indications of the standard Vicat needle test. A sample of this highly cementitious material when tested in the ordinary way with three parts of commercial sand in air give the following high tensile strengths: at seven days 125 pounds per square inch and at twenty-eight days 151 pounds per square inch.

For the purpose of incorporating and densifying hydrated lime with strength accelerating material of this character, roller mills or centrifugal roll mills such as Kent mills may be used with good results or any other available mechanical device which suitably compresses the particles and seems to destroy their loose fluffy character. When hydrated high calcium lime, for example, is passed through a suitable roller mill with five to fifteen per cent. of calcium aluminate strength accelerating material the volume of the material may be efficiently reduced to fifty to sixty-five per cent. of its original volume and an important increase in the plasticity and reliability of the material effected only about two-thirds as much water being required to gage this plastic composition and bring it to a standard consistency after it has been densified in this way and incorporated with the usual amount of sand. The relatively small proportion of gaging water required to give the proper consistency to such plaster compositions renders them more tenacious and more plastic and workable under service conditions and also promotes quick and uniform drying and hardening and minimizes the shrinking and cracking which sometimes occurs when ordinary light fluffy hydrated lime is used in the regular way for wall plastering. The densifying action taking place can be appreciated from the considerably less fluffy character of the material, which is however more quickly penetrated by water, and from the fact that the densifying treatment changes the material so that, for example, only about 90 per cent. passed through the standard 200-mesh sieve after crushing together and densifying, while about 98 per cent. originally passed through this standard sieve. The densified material absorbs water much more rapidly as is indicated for instance by pouring water upon an equal quantity of material shaken together to form a thick layer in a beaker, the supernatent water penetrating the densified hydrate in a small fraction of the time required to penetrate and moisten an uncompacted hydrate composition. When the particles of ordinary hydrated lime and suitable strength accelerating material are crushed together in this way any quicklime or burnt hydrate due to overheating during the hydration process is rendered much less objectionable and the composition made available in many cases for use in wall plaster or other cementitious compositions. This crushing together and condensing or densifying action forces the fine particles together so intimately as to apparently effect some close physical or in some cases chemical union or combination, making the strength accelerating material more effective in many instances, some of these results being secured by merely grinding the materials together even where noticeable densifying is not effected, although further improvement is usually secured by densifying action reducing the volume by ten or twenty per cent. or more. Various available lime compositions, such as hydrated magnesian lime and especially hydrated high calcium lime, sometimes comprising quicklime, may be intimately incorporated and densified by being crushed together in this way with strength accelerating material of various kinds, such as high lime or low lime calcium aluminates, calcium sulfate, potassium or sodium bisulfate or the like or mixtures thereof, and also in some cases with Portland or other cements having a slight strength accelerating action of different character which is useful for some purposes. When thoroughly ground and incorporated a small percentage of quicklime seems in some cases to have a beneficial action in such compositions increasing their early strength and hardness, and two to ten per cent. or more of quicklime may be added to the hydrate or be present therewith, especially in plaster compositions containing calcium aluminate and sodium bisulfate or sodium acid sulfate.

A hydrated lime, which was so imperfectly hydrated and manufactured that in its physical characteristics, it was unsuited for plastering, since besides containing free lime, it was very fluffy, making it difficult to mix with sand and water for mortar and was soft and friable when used for plastering, was found on analysis to have the following composition.

| | |
|---|---|
| Silica ($SiO_2$) | 0.62% |
| Ferric oxid and alumina ($R_2O_3$) | 0.52 |
| Calcium carbonate ($CaCO_3$) | 8.45 |
| Calcium hydrate ($Ca(OH)_2$) | 86.83 |
| Calcium oxid (CaO) | 2.90 |
| Magnesia (MgO) | 0.31 |
| Mechanically contained water | 0.56 |

This hydrate, after being mixed in the proportions of 85 parts by weight of the hydrate with 15 parts by weight of calcium aluminate which had been previously mixed with 12% of sodium bisulfate or sodium acid sulfate, was subjected to the densifying action of an intermittent ball-mill for a period of 20 minutes with the following comparative results between the composition in its uncompacted and densified conditions when tested to determine the percentages passing the standard 100 and 200 mesh sieves.

| | Fineness through sieves. | |
|---|---|---|
| | Uncompacted. | Densified. |
| 100 mesh | 96.4 % | 90 % |
| 200 mesh | 92.8 | 85.6 |

The relative volumes of an equal weight of the uncompacted and densified or compacted composition and the proportion of water required to gage to uniform consistency for test pieces the resulting mortars when each composition was mixed with four parts of sand was as follows:

| Weight of composition. | Uncompacted. | Densified. |
|---|---|---|
| 1,000 grams | 840 cubic centimeters. | 430 cubic centimeters. |
| Gaging water by weight. | 15.4% | 11.4% |

These diversely treated compositions were used for plastering on common wood lath. The densified or compacted and the uncompacted compositions were mixed with the same quantity of sand, gaged and tempered, and applied on a lathed wall in the usual manner and the following differences were noted. The uncompacted composition was quite difficult to mix with the sand and gaging water, and worked short, besides requiring about one-fourth more gaging water than did the densified composition. The mortar made from the densified composition containing an equal amount of sand, was more plastic, worked more freely and smoothly under the trowel, cracked less and developed greater strength at earlier periods and remained stronger than the uncompacted composition. Under the strictly comparable testing conditions the plaster made from the densified material required only three days before being ready for the application of the white coat, as against seven days for the uncompacted composition and similar advantages have been observed in many other tests and in large scale commercial plastering with generally similar compositions.

Having described the inventions in this case, which is a continuation in part, that is, contains subject-matter taken from our copending applications filed March 29, 1909 as Serial No. 486,432 and filed July 11, 1911 as Serial No. 637,903, containing material from our applications filed September 27, 1907 as Serial No. 394,916 and renewed November 22, 1909 as Serial No. 529,294 and filed July 3, 1908 as Serial No. 441,731 in connection with a number of illustrative ingredients, proportions, formulas, methods of preparation, forms of apparatus and orders of steps, to the details of which disclosure the invention is not of course to be limited, what is claimed as new and what is desired to be secured by Letters Patent is set forth in the appended claims.

We claim:

1. The process of making hydrated lime plastic compositions which consists in crushing together about 85 parts of hydrated high calcium lime containing 5% or so of quicklime, 10 to 15 parts of fused low lime, slow setting calcium aluminate and a few per cent. of sodium acid sulfate to intimately incorporate the components and materially densify the composition and increase its plasticity and reliability.

2. The process of making hydrated lime plaster compositions which consists in crushing together hydrated high calcium lime, fused slow setting, low lime calcium aluminate and sodium acid sulfate to intimately incorporate the components and densify the composition and reduce its volume to less than 90% of its original volume and increase its plasticity and reliability under service conditions.

3. The process of making hydrated lime plaster compositions which consists in crushing together hydrated high calcium lime and strength accelerating material comprising calcium aluminate to intimately incorporate the components and densify the composition and reduce its volume to less than 85% of its original volume and increase its plasticity and reliability under service conditions.

4. The process of making plaster compositions which consists in intimately incorporating hydrated high calcium lime and coöperating strength accelerating material and in materially densifying the composition to effect intimate physical union between the components of the composition and increase its plasticity and reliability under service conditions.

5. The process of making plaster compositions which consists in crushing together hydrated lime containing 5% or so of quicklime, a small proportion of fused calcium aluminate and coöperating strength accelerating material to intimately incorporate the components and densify the composition and increase its plasticity, reliability and quickness of drying and hardening under service conditions.

6. The process of making hydrated lime plaster compositions which consists in crushing together hydrated lime, fused slow setting, low lime calcium aluminate and sodium acid sulfate to intimately incorporate the components and densify the composition and reduce its volume and increase its plasticity and reliability under service conditions.

7. The process of making hydrated lime plaster compositions which consists in crushing together hydrated lime and strength accelerating material comprising calcium aluminate to intimately incorporate the composition and densify the composition and reduce its volume to less than 85% of its original volume and increase its plasticity and reliability under service conditions.

8. The process of making plaster compositions which consists in intimately incorporating hydrated lime and coöperating strength accelerating material and in materially densifying the composition to effect intimate physical union between the particles of the composition and increase its plasticity and reliability under service conditions.

9. The process of making plaster compositions which consists in incorporating hydrated lime and coöperating aluminous strength accelerating material and in mechanically forcing the particles of the component materials strongly together to materially densify the composition and increase its plasticity and reliability under service conditions.

10. The process of increasing the plasticity, reliability and ease of working of hydrated lime plaster compositions under service conditions which consists in intimately incorporating the composition and effecting the close physical union of the fine particles thereof and in densifying the composition to reduce its volume and increase the rapidity with which it absorbs gaging water and reduce the amount of gaging water required to secure a standard consistency.

11. The process of increasing the plasticity and reliability of plaster compositions consisting largely of hydrated lime and containing coöperating strength accelerating material which comprises intimately incorporating the composition to effect close physical union of the particles thereof and materially densifying the composition.

12. The process of increasing the plasticity, reliability and quickness of drying and hardening of hydrated lime plaster compositions under service conditions which comprises crushing together the composition to intimately incorporate the finely divided particles and in densifying the composition to reduce its volume to less than 85% of its original volume and increase the rapidity with which it absorbs gaging water and reduce the amount of gaging water required to secure a standard consistency.

13. The process of increasing the plasticity and reliability of hydrated lime plaster compositions comprising calcium aluminate and alkaline bisulfate which comprises crushing together the composition and densifying the composition.

14. The process of increasing the plasticity and reliability of hydrated lime plaster compositions comprising aluminous strength accelerating material which consists in crushing together the composition to effect the close physical union of the particles of the composition.

15. The dense finely divided dry wall plaster composition comprising approximately 85 parts of hydrated high calcium lime containing 5% or so of quicklime, 10 to 15 parts of fused low lime calcium aluminate and a small proportion of sodium acid sulfate crushed together and intimately incorporated and thereby densified to increase the plasticity and reliability of the composition under service conditions.

16. The dense finely divided substantially dry wall plaster composition consisting in large proportion of hydrated high calcium lime and strength accelerating material comprising calcium aluminate crushed together and intimately incorporated.

17. The dense finely divided substantially dry plaster composition consisting in large part of hydrated high calcium lime and coöperating strength accelerating material crushed together and intimately incorporated, said composition having a volume of less than 700 cubic centimeters per kilogram.

18. The dense finely divided dry wall plaster composition comprising approximately 85 parts of hydrated lime containing 5% or so of quicklime, 10 to 15 parts of fused low lime calcium aluminate and a small proportion of sodium acid sulphate crushed together and intimately incorporated and thereby densified to increase the plasticity and reliability of the composition under service conditions.

19. The dense finely divided substantially dry wall plaster composition consisting in large proportion of hydrated lime and strength accelerating material comprising calcium aluminate crushed together and intimately incorporated.

20. The dense finely divided substantially dry plaster composition consisting in large part of hydrated lime and coöperating strength accelerating material crushed together and intimately incorporated, said composition having a volume of less than 700 cubic centimeters per kilogram.

HENRY S. SPACKMAN.
ELLIS W. LAZELL.

Witnesses:
ANNA C. BRUNNER,
E. L. CONWELL,
ALICE OGLER,
E. O. QUINN.